United States Patent
Kang et al.

(10) Patent No.: US 9,401,955 B2
(45) Date of Patent: Jul. 26, 2016

(54) METHOD OF INTEGRATING NETWORK STORAGE SPACES AND CONTROL SYSTEM THEREOF

(71) Applicant: Wistron Corporation, New Taipei (TW)

(72) Inventors: Hung-Ming Kang, New Taipei (TW); Chi-Hsiang Yeh, New Taipei (TW); Jia-Cyuan Fan, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 327 days.

(21) Appl. No.: 14/160,581

(22) Filed: Jan. 22, 2014

(65) Prior Publication Data

US 2015/0100695 A1    Apr. 9, 2015

(30) Foreign Application Priority Data

Oct. 8, 2013 (TW) .............................. 102136368 A (51) Int. Cl.
*G06F 15/173* (2006.01)
*H04L 29/08* (2006.01)
*G06F 9/50* (2006.01)
*H04L 12/24* (2006.01)

(52) U.S. Cl.
CPC .............. *H04L 67/10* (2013.01); *G06F 9/5072* (2013.01); *H04L 67/1097* (2013.01); *H04L 41/5096* (2013.01)

(58) Field of Classification Search
CPC . H04L 67/10; H04L 67/1097; H04L 41/5096; G06F 9/5072
See application file for complete search history.

(56) References Cited

U.S. PATENT DOCUMENTS

| | | | |
|---|---|---|---|
| 8,352,482 B2 | 1/2013 | Hansen | |
| 8,914,669 B2 * | 12/2014 | Dhuse | H04L 9/085 714/6.2 |
| 9,075,529 B2 * | 7/2015 | Karve | G06F 3/0619 |
| 2002/0136406 A1 * | 9/2002 | Fitzhardinge | H04N 5/913 380/210 |
| 2004/0260862 A1 * | 12/2004 | Anderson | G06F 3/0605 711/100 |
| 2007/0150481 A1 * | 6/2007 | Song | G06F 17/30097 |
| 2009/0010155 A1 * | 1/2009 | Liu | H04Q 3/0066 370/230 |
| 2010/0014510 A1 * | 1/2010 | Boreli | H04L 29/06027 370/352 |
| 2011/0228931 A1 * | 9/2011 | Grube | G06F 11/1076 380/201 |
| 2012/0084386 A1 | 4/2012 | Fu | |
| 2012/0137091 A1 * | 5/2012 | Grube | G06F 12/0638 711/158 |
| 2013/0073901 A1 * | 3/2013 | Syrgabekov | G06F 11/1096 714/6.24 |
| 2015/0254150 A1 * | 9/2015 | Gordon | G06F 11/1662 714/6.3 |

FOREIGN PATENT DOCUMENTS

| | | |
|---|---|---|
| TW | I301021 | 9/2008 |
| TW | 201216073 A1 | 4/2012 |

OTHER PUBLICATIONS

Office action mailed on Dec. 29, 2015 for the Taiwan application No. 102136368, filing date: Oct. 8, 2013, p. 1 line 10-14, p. 2-4 and p. 5 line 1-17.

* cited by examiner

*Primary Examiner* — Jonathan Bui
(74) *Attorney, Agent, or Firm* — Winston Hsu; Scott Margo (57) ABSTRACT

A method of integrating a plurality of network storage spaces includes: receiving data in a single user interface; dividing the data into a plurality of sub-data, wherein the plurality of sub-data correspond to the plurality of network storage spaces, respectively; and uploading each of the plurality of sub-data to a corresponding network storage space among the plurality of network storage spaces.

18 Claims, 6 Drawing Sheets

METHOD OF INTEGRATING NETWORK STORAGE SPACES AND CONTROL SYSTEM THEREOF

BACKGROUND OF THE INVENTION

1. Field of the Invention

The present invention relates to a method of managing data storage in network storage spaces, and more particularly, to a storage method capable of integrating a plurality of network storage spaces and a control system thereof.

2. Description of the Prior Art

With advancements of cloud computing technology, data storage is gradually transferred from hard disk drives in the personal computer to cloud storage services in the network. Such cloud storage services allow the user to upload files to cloud servers via a computer or mobile device, and various applications are generated in accordance with these services. In recent years, many network service providers provide free network spaces for the user, such as Windows Live SkyDrive of MSN and Google Drive provided by Google. These network spaces provide storage spaces in different sizes for the user.

Figure 1:
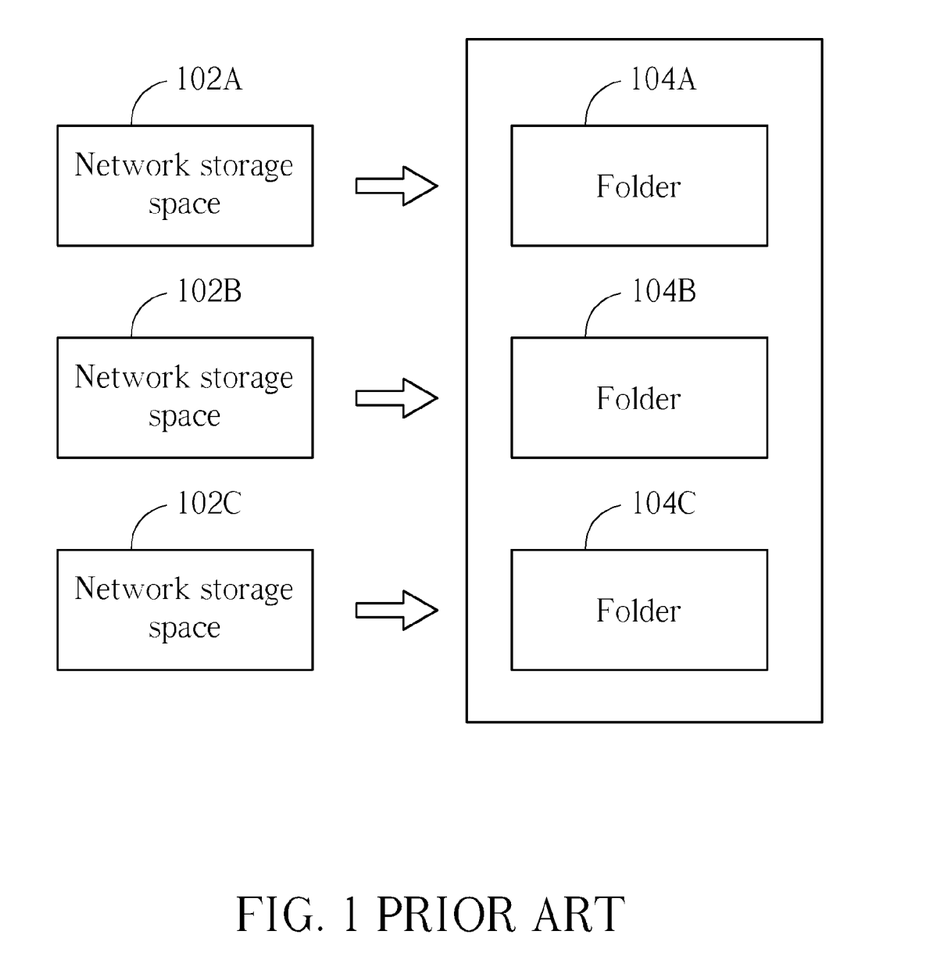
FIG. 1 is a schematic diagram of a conventional network storage space integration system.

For most users of the cloud services, there is no feasible interface to manage these free network spaces, which brings about several management problems that may cause a user to be unwilling to use these network spaces. For example, the user may unintentionally upload the same file to different network spaces, or the user may not remember in which network space a specific file is stored. Although several network space integration systems are now commercially available (such as Gladinet and Otixo), these integration systems usually map each network space to a distinct folder, which still possesses operating inconvenience. For example, as shown in FIG. 1, network storage spaces 102A-102C are mapped to folders 104A-104C, respectively. The user has to search each folder 104A-104C for available storage spaces in the network storage spaces 102A-102C, and then manually calculate whether the size of the file to be uploaded exceeds the available storage space in each network storage space 102A-102C, which reduces the convenience. Thus, there is a need for improvement over the prior art.

SUMMARY OF THE INVENTION

It is therefore an objective of the present invention to provide a method of integrating a plurality of network storage spaces and a control system thereof, which are capable of integrating all network storage spaces used by the user via an integrated interface, so that the user does not need to search available storage spaces in the folder corresponding to each network storage space. The convenience is therefore enhanced.

An embodiment of the invention discloses a method of integrating a plurality of network storage spaces. The method comprises receiving data in a single user interface; dividing the data into a plurality of sub-data, wherein the plurality of sub-data correspond to the plurality of network storage spaces, respectively; and uploading each of the plurality of sub-data to a corresponding network storage space among the plurality of network storage spaces.

An embodiment of the invention further discloses a control system, which comprises a plurality of network storage spaces; a single user interface for receiving data; a processor; and a storage unit. The storage unit has a program for instructing the processor to perform a method of integrating the plurality of network storage spaces, wherein the method comprises dividing the data into a plurality of sub-data, wherein the plurality of sub-data corresponds to the plurality of network storage spaces, respectively; and uploading each of the plurality of sub-data to a corresponding network storage space among the plurality of network storage spaces.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
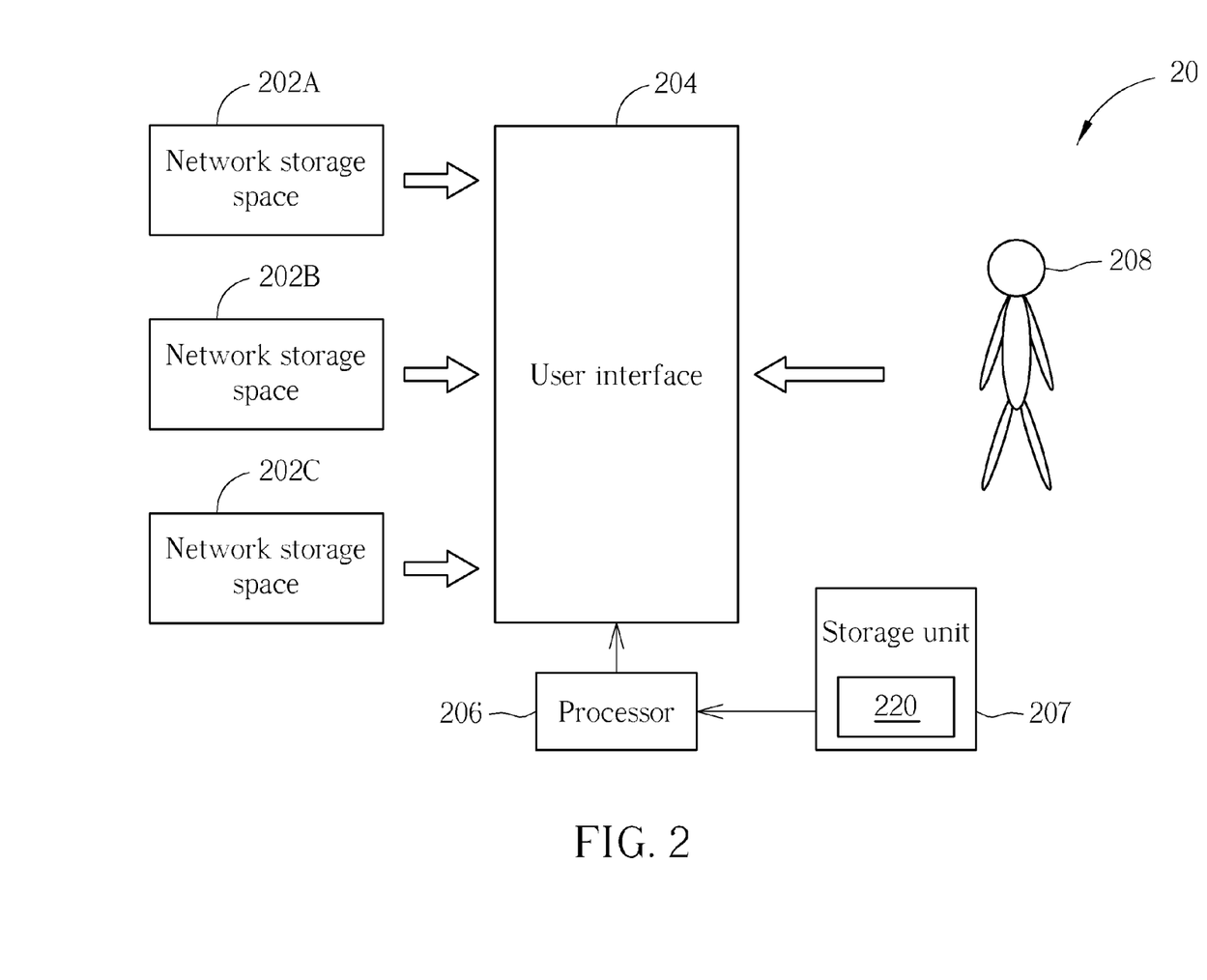
FIG. 2 is a schematic diagram of a control system according to an embodiment of the invention.

Please refer to FIG. 2, which is a schematic diagram of a control system 20 according to an embodiment of the invention. As shown in FIG. 2, the control system 20 includes network storage spaces 202A-202C, a user interface 204, a processor 206 and a storage unit 207. The network storage spaces 202A-202C may be storage media for network service providers to provide network storage services, which may include SkyDrive and Google Drive, etc. The network service providers may use hard disk drives as storage equipment of the network storage spaces 202A-202C. Other types of storage equipment may also be used for the network storage spaces 202A-202C such as a solid state drive (SSD), but this is not limited herein. The user interface 204, which is provided for a user 208 as an interface for uploading or downloading data, may be displayed on a screen in a folder form. The storage unit 207 may be a read-only memory (ROM), random-access memory (RAM), compact disk read-only memory (CD-ROM), magnetic tape, floppy disk, optical data storage device, or any other types of memories. The storage unit 207 is utilized for storing a program 220 for instructing the processor 206 to perform the method of integrating the network storage spaces 202A-202C.

Figure 3:
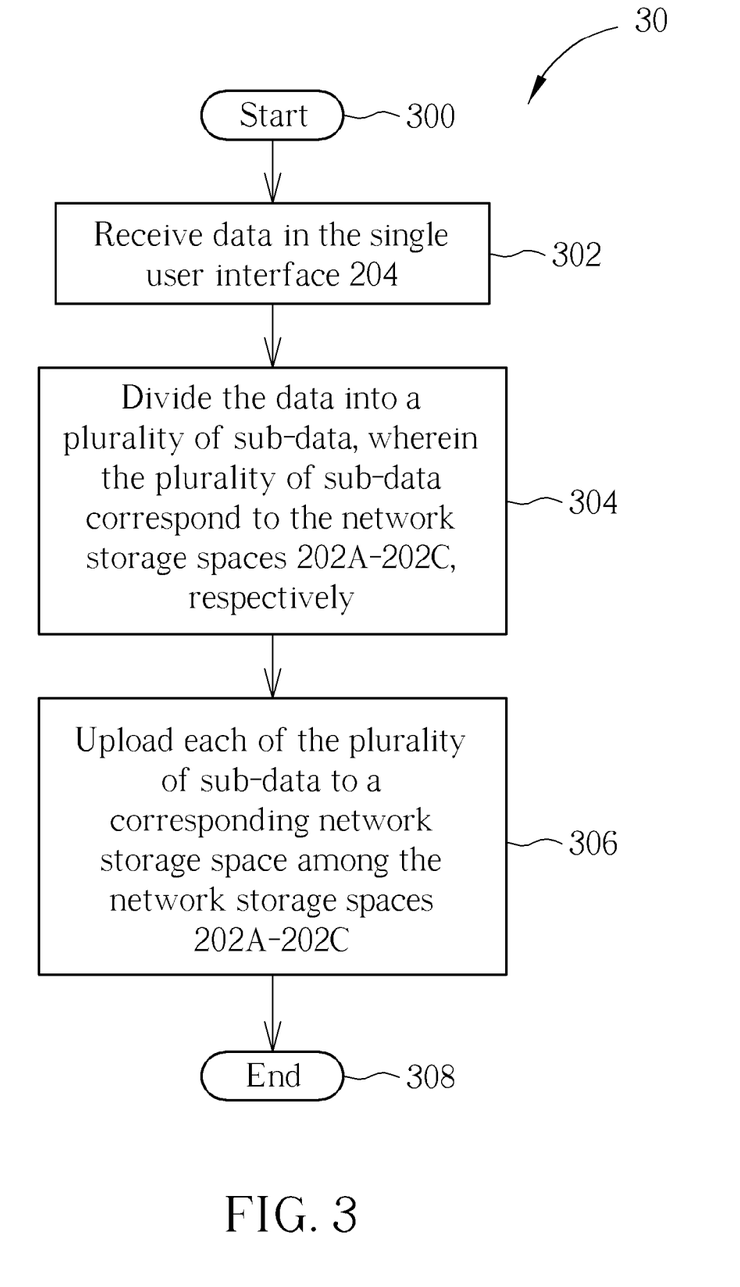
FIG. 3 is a schematic diagram of a process according to an embodiment of the invention.

Please refer to FIG. 3, which is a schematic diagram of a process 30 according to an embodiment of the invention. The process 30 may be executed in the control system 20 shown in FIG. 2 and compiled into the program 220 to be stored in the storage unit 207 for integrating the network storage spaces 202A-202C. The process 30 includes the following steps:

Step 300: Start.

Step 302: Receive data in the single user interface 204.

Step 304: Divide the data into a plurality of sub-data, wherein the plurality of sub-data correspond to the network storage spaces 202A-202C, respectively.

Step 306: Upload each of the plurality of sub-data to a corresponding network storage space among the network storage spaces 202A-202C.

Step 308: End.

According to the process 30, the control system 20 first receives data to be uploaded by the user 208 via the user interface 204, and the data may be divided into a plurality of sub-data. In this embodiment, since there are three network storage spaces 202A-202C, the data may be divided into three sub-data corresponding to the network storage spaces 202A-202C, respectively. The control system 20 then uploads each sub-data to the corresponding network storage space, respectively.

Please note that, as shown in FIG. 1, each network storage space 102A-102C corresponds to a folder 104A-104C, respectively; the user has to access data in each network storage space 102A-102C via the corresponding folder 104A-104C according to whether each network storage space 102A-102C still has available space. In comparison, in the control system 20 of the present invention, the user 208 may use the single user interface 204 (e.g. a single folder) to upload data to the network storage spaces 202A-202C simultaneously, or download data from the network storage spaces 202A-202C simultaneously. The processor 206 may automatically allocate a location for storing the data according to the status of the network storage spaces 202A-202C.

Figure 4:
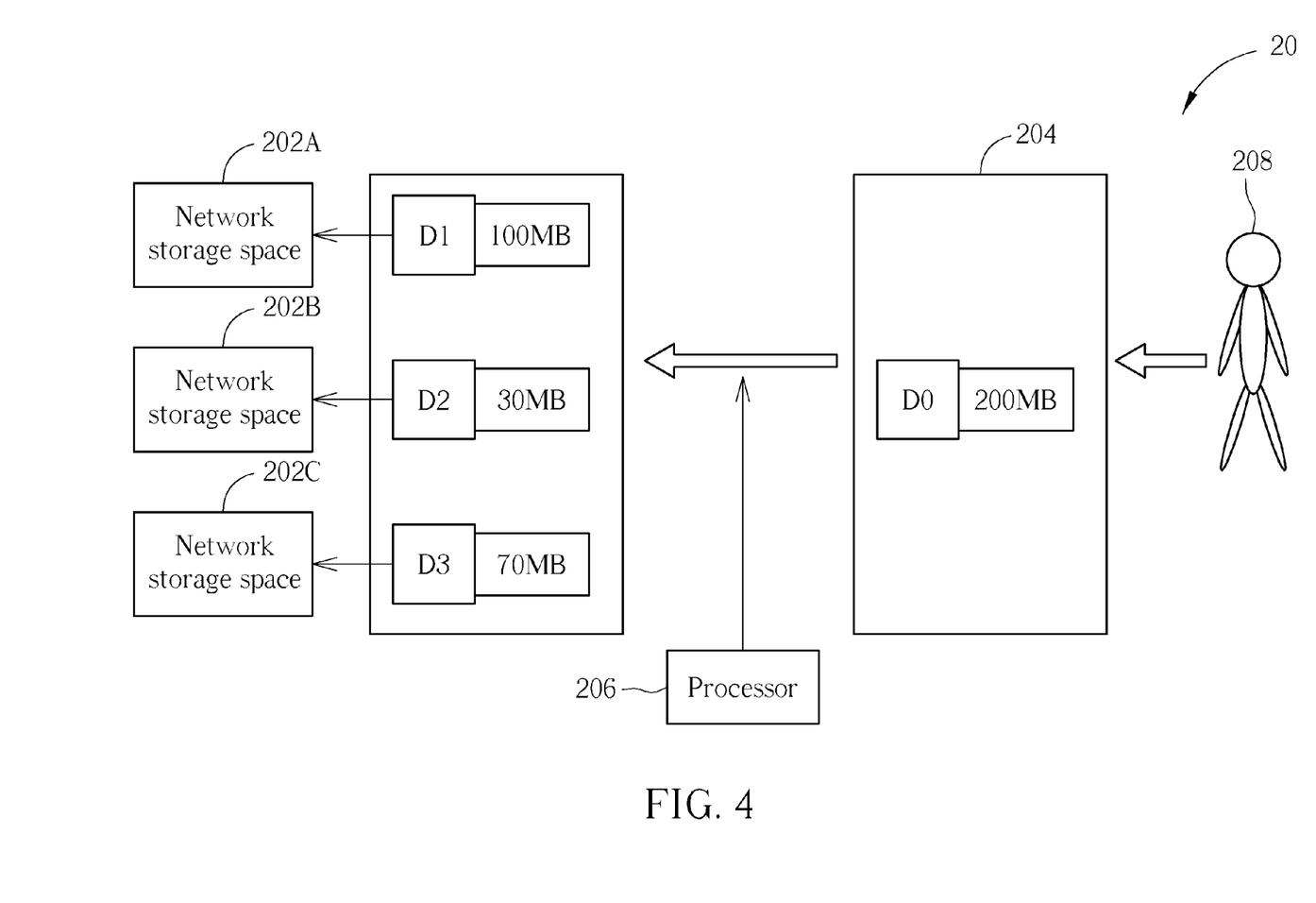
FIG. 4 is a schematic diagram of dividing uploaded data according to an embodiment of the invention.

In an embodiment, the data uploaded by the user is divided into several sub-data, wherein each sub-data correspond to a network storage space among the network storage spaces 202A-202C, respectively. The control system 20 then uploads each sub-data to the corresponding network storage space. For example, please refer to FIG. 4, which is a schematic diagram of dividing uploaded data according to an embodiment of the invention. As shown in FIG. 4, when the user 208 needs to upload data D0 with the size equal to 200 MB, the user 208 only needs to upload the data D0 to the user interface 204. The processor 206 then divides the data D0 into sub-data D1-D3 having a size equal to 100 MB, 30 MB and 70 MB, respectively. The sub-data D1-D3 are uploaded to the network storage spaces 202A-202C, respectively, to accomplish the uploading process of the data D0. By the above data storage method, the user will not need to search the available storage space in each of the network storage spaces 202A-202C, so that the convenience will be enhanced. After the data D0 is divided into the sub-data D1-D3, the sub-data D1-D3 may be uploaded to different network storage spaces 202A-202C synchronously, so that time required for uploading data is significantly reduced and the efficiency of data uploading is increased. When the user 208 needs to download the data stored in the network storage spaces 202A-202C, the user 208 may only need to perform an instruction on the user interface 204. The control system 20 may then collect and combine the sub-data in each of the network storage spaces 202A-202C to provide the data for the user 208.

In general, the data uploaded by the user may be divided into sub-data in any manner. In some embodiments, the processor 206 may divide the data according to the status of the network storage spaces, in order to obtain preferable storage performance. For example, in an embodiment, data division may be determined according to the size of available storage space in each network storage space, to thereby optimize the efficiency of using the network storage spaces. More specifically, in each network storage space, if the available storage space in a first network storage space is larger, the processor 206 may allocate larger sub-data to be uploaded to the first network storage space; if the available storage space in a second network storage space is smaller, the processor 206 may allocate smaller sub-data to be uploaded to the second network storage space. Furthermore, the processor 206 may divide data in proportion to the size of the available storage space in each network storage space, so that the size of the sub-data corresponding to each network storage space is proportional to the size of the available storage space in the corresponding network storage space.

Figure 5:
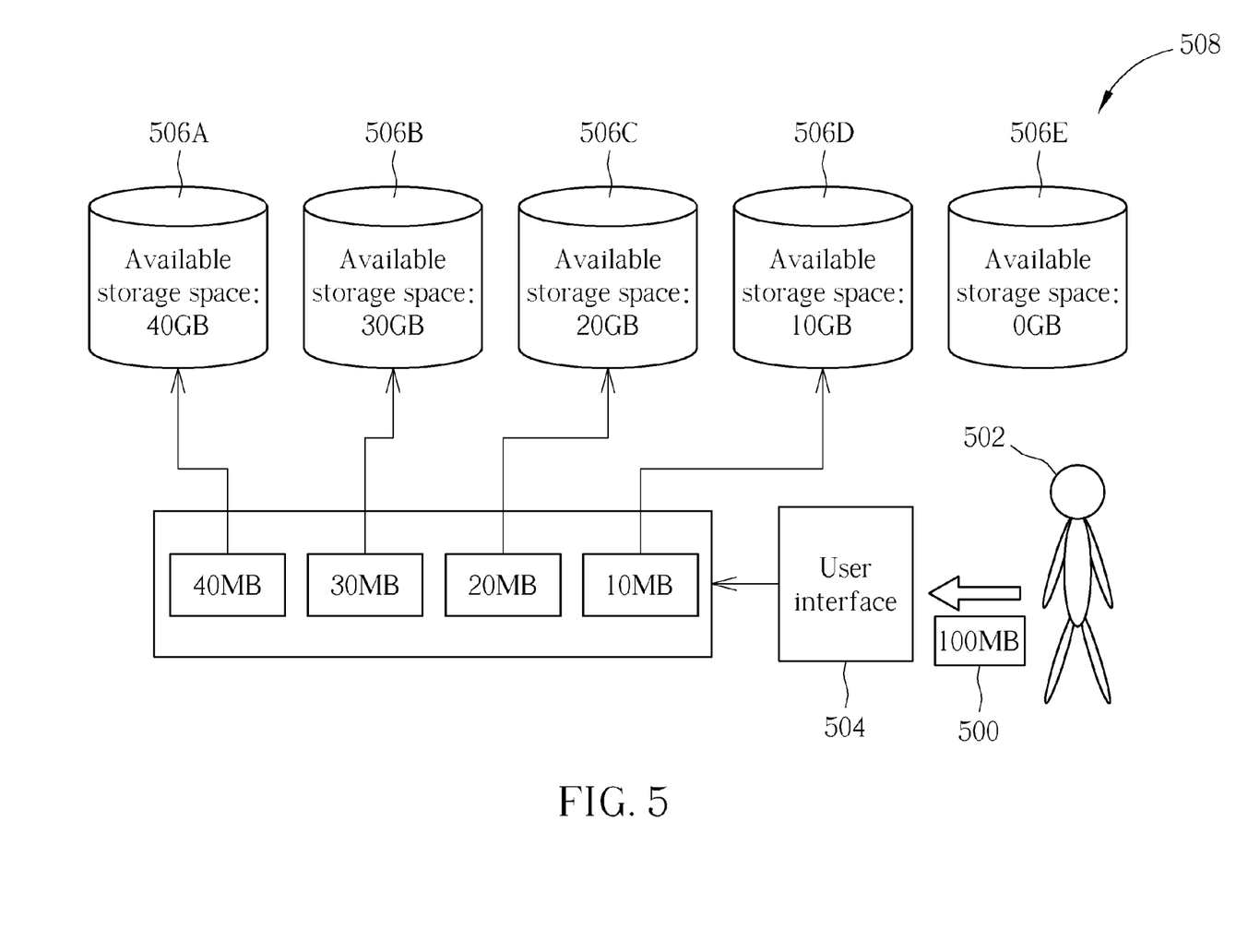
FIG. 5 is a schematic diagram of a file allocated to a plurality of network storage spaces according to an embodiment of the invention.

Please refer to FIG. 5, which is a schematic diagram of a control system 508 allocating a file 500 to network storage spaces 506A-506E according to an embodiment of the invention. The control system 508 is derived from the control system 20, and the implementations related to such control systems are illustrated above. The control system 508 may divide data further according to the status of the network storage spaces, in order to obtain preferable storage performance. As shown in FIG. 5, when a user 502 needs to upload a file 500 with the size equal to 100 MB, the user 502 only needs to upload the file 500 to a user interface 504. At this moment, the control system 508 first obtains the size of available storage space in each network storage space 506A-506E, wherein the size of the available storage space in the network storage space 506A is equal to 40 GB, the size of the available storage space in the network storage space 506B is equal to 30 GB, the size of the available storage space in the network storage space 506C is equal to 20 GB, the size of the available storage space in the network storage space 506D is equal to 10 GB, and the size of the available storage space in the network storage space 506E is equal to 0 GB. In order to efficiently use the available storage spaces in each network storage space 506A-506E, the control system 508 may divide the file 500 into sub-files of a size equal to 40 MB, 30 MB, 20 MB and 10 MB, respectively, according to the ratio of the available storage spaces in the network storage spaces 506A-506D, i.e. 40:30:20:10. The control system 508 then uploads the 40 MB sub-file to the network storage space 506A, uploads the 30 MB sub-file to the network storage space 506B, uploads the 20 MB sub-file to the network storage space 506C, and uploads the 10 MB sub-file to the network storage space 506D. Since the network storage space 506E has no available storage space (0 GB), the control system 508 will not allocate any sub-files to the network storage space 506E. By such an allocation method, the space utilization of the network storage spaces 506A-506E will be optimized. Since each sub-file is uploaded to the network storage spaces 506A-506D synchronously, time for uploading the file will be significantly reduced, so that the file uploading efficiency is enhanced.

Please note that the present invention provides a method and system capable of integrating a plurality of network storage spaces via a single user interface, wherein the method and system divide data to be uploaded into sub-data and upload each sub-data to a corresponding network storage space. Those skilled in the art can make modifications and alternations accordingly. For example, the above embodiments divide the original data into sub-data and then upload the sub-data, but in other embodiments, a verification message or error correcting information may also be included in the original data before the original data is divided, in case any sub-data is damaged or an error occurs in the uploading process. When an error occurs, data can still be recovered via the verification message or the error correcting information. Alternatively, data backup may be performed in different network storage spaces, so that the accurate data will still be recovered even when any of the sub-data in a network storage space is damaged. When the above backup method is applied for uploading sub-data, the data quantity required to be uploaded will be larger, and thus the time for uploading the data will be longer. The user may select whether to include the verification message or error correcting information in the data according to the importance of data or other requirements.

As mentioned above, the processor may divide the data into sub-data in any manner according to various purposes or requirements. In the above embodiment, the method of dividing the data into the sub-data is determined according to the size of the available storage space in each network storage space, to optimize the efficiency of network space usage. In other embodiments, the data may also be divided into sub-data according to access speed of the network storage spaces, so that the efficiency of data uploading may be optimized. For example, if the access speed of a third network storage space is faster, the processor may allocate larger sub-data to be uploaded to the third network storage space; if the access speed of a fourth network storage space is slower, the processor may allocate smaller sub-data to be uploaded to the fourth network storage space. In addition, data division may also be performed by other methods, and is not limited herein.

Figure 6:
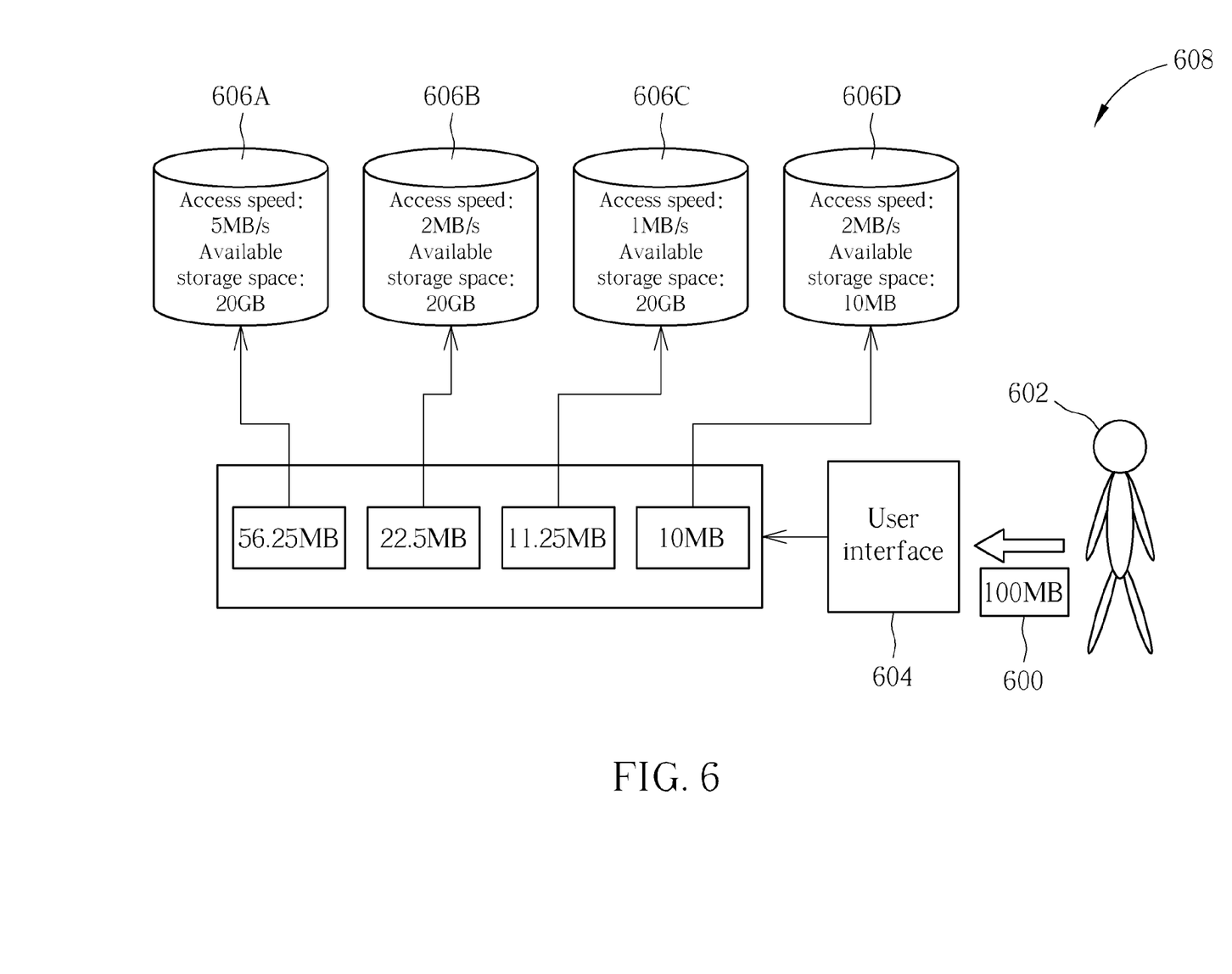
FIG. 6 is a schematic diagram of another file allocated to a plurality of network storage spaces according to an embodiment of the invention.

Please refer to FIG. 6, which is a schematic diagram of a control system 608 allocating a file 600 to network storage spaces 606A-606D according to an embodiment of the invention. The control system 608 is derived from the control system 20, and the implementations related to such control systems are illustrated above. The control system 608 may divide data further according to the access speed of the network storage spaces, in order to optimize the data uploading efficiency. As shown in FIG. 6, when a user 602 needs to upload a file 600 with the size equal to 100 MB, the user 602 only needs to upload the file 600 to a user interface 604. At this moment, the control system 608 first obtains the access speed of each network storage space 606A-606D, wherein the access speed of the network storage space 606A is equal to 5 MB/s, the access speed of the network storage space 606B is equal to 2 MB/s, the access speed of the network storage space 606C is equal to 1 MB/s, and the access speed of the network storage space 606D is equal to 2 MB/s. In order to ensure that each network storage space 606A-606D has enough storage space for storing the allocated sub-data, the control system 608 further obtains the size of the available storage space in each network storage space 606A-606D, wherein the size of the available storage space in the network storage space 606A is equal to 20 GB, the size of the available storage space in the network storage space 606B is equal to 20 GB, the size of the available storage space in the network storage space 606C is equal to 20 GB, and the size of the available storage space in the network storage space 606D is equal to 10 MB. In order to maximize the efficiency of uploading the file 600, the control system 608 may divide the file 600 into sub-files of a size equal to 50 MB, 20 MB, 10 MB and 20 MB, respectively, according to the ratio of the access speeds of the network storage spaces 606A-606D, i.e. 5:2:1:2. The control system 608 then uploads the 50 MB sub-file to the network storage space 606A, uploads one of the 20 MB sub-files to the network storage space 606B, uploads the 10 MB sub-file to the network storage space 606C, and uploads the other 20 MB sub-file to the network storage space 606D. The network storage space 606D has only 10 MB storage space available, however, which is insufficient for uploading the 20 MB sub-file. The surplus 10 MB sub-file will therefore be divided into 6.25 MB, 2.5 MB and 1.25 MB respectively according to the ratio of 5:2:1 to be uploaded to the network storage spaces 606A-606C. As a result, the size of the sub-files finally uploaded to the network storage spaces 606A-606D will be 56.25 MB, 22.5 MB, 11.25 MB and 10 MB, respectively.

In the embodiment of FIG. 6, the processor may divide the data in proportion to the access speed of each network storage space 606A-606D, so that the size of the sub-data corresponding to each network storage space 606A-606D is proportional to the access speed of the network storage space 606A-606D. By such an allocation method, the efficiency of uploading the file 600 to the network storage spaces 606A-606D will be maximized, which minimizes the time required for uploading the file.

In the prior art, there is no feasible interface provided for users to manage various free network spaces, which brings about several management problems potentially resulting in the user being unwilling to use the network spaces. For example, the user may unintentionally upload the same file to different network spaces, or the user may not remember in which network space a specific file is. In comparison, the present invention provides a method of integrating a plurality of network storage spaces and a control system thereof, which are capable of integrating all network storage spaces used by the user via an integrated interface. The user only needs to upload a file via a single user interface, and the file may be divided into a plurality of sub-files and simultaneously uploaded to each network storage space, which not only increases the convenience, but also enhances the file uploading efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of integrating a plurality of network storage spaces, comprising:
   receiving data in a single user interface;
   dividing the data into a plurality of sub-data, wherein the plurality of sub-data correspond to the plurality of network storage spaces, respectively, and each of the plurality of sub-data corresponds to a single network storage space among the plurality of network storage spaces, respectively; and
   uploading each of the plurality of sub-data to the single network storage space among the plurality of network storage spaces;
   wherein the step of dividing the data into the plurality of sub-data comprises:
      allocating a size of each of the plurality of sub-data corresponding to each of the plurality of network storage spaces according to an access speed of each of the plurality of network storage spaces, in order to divide the data into the plurality of sub-data.

2. The method of claim 1, wherein the step of dividing the data into the plurality of sub-data comprises:
   allocating a size of each of the plurality of sub-data corresponding to each of the plurality of network storage spaces according to a size of an available storage space in each of the plurality of network storage spaces, in order to divide the data into the plurality of sub-data.

3. The method of claim 2, wherein when an available storage space in a first network storage space among the plurality of network storage spaces is greater than an available storage space in a second network storage space among the plurality of network storage spaces, a size of a first sub-data corresponding to the first network storage space is greater than a size of a second sub-data corresponding to the second network storage space.

4. The method of claim 2, wherein the step of allocating the size of each of the plurality of sub-data corresponding to each of the plurality of network storage spaces according to the size of the available storage space in each of the plurality of network storage spaces in order to divide the data into the plurality of sub-data further comprises:

dividing the data in proportion to the size of the available storage space in each of the plurality of network storage spaces, so that a size of sub-data corresponding to each of the plurality of network storage spaces is proportional to the size of the available storage space in the corresponding network storage space.

5. The method of claim 1, wherein when an access speed of a third network storage space among the plurality of network storage spaces is greater than an access speed of a fourth network storage space among the plurality of network storage spaces, a size of a third sub-data corresponding to the third network storage space is greater than a size of a fourth sub-data corresponding to the fourth network storage space.

6. The method of claim 1, wherein the step of allocating the size of each of the plurality of sub-data corresponding to each of the plurality of network storage spaces according to the access speed of each of the plurality of network storage spaces in order to divide the data into the plurality of sub-data comprises:
dividing the data in proportion to the access speed of each of the plurality of network storage spaces, so that a size of sub-data corresponding to each of the plurality of network storage spaces is proportional to the access speed of the corresponding network storage space.

7. The method of claim 6, wherein when a size of sub-data allocated to a network storage space among the plurality of network storage spaces is greater than an available storage space of the network storage space, the method further comprises:
allocating a surplus portion greater than the available storage space of the network storage space in the sub-data to network storage spaces other than the network storage space among the plurality of network storage spaces in proportion to the access speeds of the network storage spaces other than the network storage space among the plurality of network storage spaces.

8. The method of claim 1, wherein the plurality of network storage spaces utilize a plurality of network-attached hard disk drives as storage equipment.

9. The method of claim 1, further comprising:
uploading a verification message or error correcting information corresponding to the data to at least one network storage space among the plurality of network storage spaces when uploading the plurality of sub-data, in order to recover the data via the verification message or the error correcting information when one of the plurality of sub-data is damaged or an error occurs in an uploading process.

10. A control system, comprising:
a plurality of network storage spaces;
a single user interface, for receiving data;
a processor; and
a storage unit, having a program for instructing the processor to perform a method of integrating the plurality of network storage spaces, the method comprising:
dividing the data into a plurality of sub-data, wherein the plurality of sub-data correspond to the plurality of network storage spaces, respectively, and each of the plurality of sub-data corresponds to a single network storage space among the plurality of network storage spaces, respectively; and
uploading each of the plurality of sub-data to the single network storage space among the plurality of network storage spaces;
wherein the method of dividing the data into the plurality of sub-data comprises:
allocating a size of each of the plurality of sub-data corresponding to each of the plurality of network storage spaces according to an access speed of each of the plurality of network storage spaces, in order to divide the data into the plurality of sub-data.

11. The control system of claim 10, wherein the method of dividing the data into the plurality of sub-data comprises:
allocating a size of each of the plurality of sub-data corresponding to each of the plurality of network storage spaces according to a size of an available storage space in each of the plurality of network storage spaces, in order to divide the data into the plurality of sub-data.

12. The control system of claim 11, wherein when an available storage space in a first network storage space among the plurality of network storage spaces is greater than an available storage space in a second network storage space among the plurality of network storage spaces, a size of a first sub-data corresponding to the first network storage space is greater than a size of a second sub-data corresponding to the second network storage space.

13. The control system of claim 11, wherein the method of allocating the size of each of the plurality of sub-data corresponding to each of the plurality of network storage spaces according to the size of the available storage space in each of the plurality of network storage spaces in order to divide the data into the plurality of sub-data further comprises:
dividing the data in proportion to the size of the available storage space in each of the plurality of network storage spaces, so that a size of sub-data corresponding to each of the plurality of network storage spaces is proportional to the size of the available storage space in the corresponding network storage space.

14. The control system of claim 10, wherein when an access speed of a third network storage space among the plurality of network storage spaces is greater than an access speed of a fourth network storage space among the plurality of network storage spaces, a size of a third sub-data corresponding to the third network storage space is greater than a size of a fourth sub-data corresponding to the fourth network storage space.

15. The control system of claim 10, wherein the method of allocating the size of each of the plurality of sub-data corresponding to each of the plurality of network storage spaces according to the access speed of each of the plurality of network storage spaces in order to divide the data into the plurality of sub-data comprises:
dividing the data in proportion to the access speed of each of the plurality of network storage spaces, so that a size of sub-data corresponding to each of the plurality of network storage spaces is proportional to the access speed of the corresponding network storage space.

16. The control system of claim 15, wherein when a size of sub-data allocated to a network storage space among the plurality of network storage spaces is greater than an available storage space of the network storage space, the program further instructs the processor to execute the following step to perform the method of integrating the plurality of network storage spaces:
allocating a surplus portion greater than the available storage space of the network storage space in the sub-data to network storage spaces other than the network storage space among the plurality of network storage spaces in proportion to the access speeds of the network storage spaces other than the network storage space among the plurality of network storage spaces.

17. The control system of claim 10, wherein the plurality of network storage spaces utilizes a plurality of network-attached hard disk drives as storage equipment.

18. The control system of claim 10, wherein the program further instructs the processor to execute the following step to perform the method of integrating the plurality of network storage spaces:

uploading a verification message or error correcting information corresponding to the data to at least one network storage space among the plurality of network storage spaces when uploading the plurality of sub-data, in order to recover the data via the verification message or the error correcting information when one of the plurality of sub-data is damaged or an error occurs in an uploading process.

\* \* \* \* \*